United States Patent [19]
Eidson et al.

[11] Patent Number: 5,566,180
[45] Date of Patent: Oct. 15, 1996

[54] METHOD FOR RECOGNIZING EVENTS AND SYNCHRONIZING CLOCKS

[75] Inventors: John C. Eidson, Palo Alto; Joseph A. Dara-Abrams, Los Altos; Stanley P. Woods, Santa Clara; Leonard S. Cutler, Los Altos Hills; Robin P. Giffard, Los Altos; James L. Johnson, Scotts Valley, all of Calif.

[73] Assignee: Hewlett-Packard Company, Palo Alto, Calif.

[21] Appl. No.: 360,508

[22] Filed: Dec. 21, 1994

[51] Int. Cl.$^6$ .................................................. H04J 3/24
[52] U.S. Cl. ................................ 370/94.2; 370/100.1
[58] Field of Search .......................... 370/94.1, 94.2, 370/94.3, 85.13, 60, 60.1, 61, 100.1, 105.1, 105.2, 105.3, 105.4, 47, 48; 340/825.01, 825.02, 825.03; 395/550; 375/354, 355, 356, 359, 363, 369

[56] References Cited

U.S. PATENT DOCUMENTS 4,748,620  5/1988  Adelmann et al. ............ 370/94.1
4,866,606  9/1989  Kopetz .......................... 395/550

*Primary Examiner*—Douglas W. Olms
*Assistant Examiner*—Dang Ton
*Attorney, Agent, or Firm*—Pamela Lau Kee

[57] ABSTRACT

The local clocks within each node of a loosely distributed network system may be synchronized and syntonized by any of the nodes in the network. Each of the nodes contains a time packet detector (TPD) that detects and recognizes timing data packets and produces a recognition signal. This signal may be used to cause an action in the detecting node, in particular the node may contain a time service block (TSB) containing a local clock that may be used to record the time of the recognition signal. The recorded times may be used as the basis for correcting the local clocks of the nodes in the system. Transfer devices such as gateways, bridges, and routers may include TSBs and TPDs to allow for correction for the transit time of time packets through the transfer device. The TPD is normally connected within the media access device at the point of final encoding for transmission or recovery of the clock and data for receiving where the time jitter will be at a minimum.

12 Claims, 13 Drawing Sheets

METHOD FOR RECOGNIZING EVENTS AND SYNCHRONIZING CLOCKS

FIELD OF THE INVENTION

This invention relates to loosely coupled distributed systems for real time applications. These systems consist of a communication medium for serial communication and a number of nodes. Each node contains an event recognizer and often a local real-time-clock. This invention more specifically relates to a method for compensating for the time delay and jitter of messages transmitted between the nodes by using the event recognizer.

BACKGROUND OF THE INVENTION

Many measurement and control applications require precise time control of events at several distributed locations (nodes) in the system. For example, the measurement and control of large scale systems such as power sub-stations, airframe test stations, and large industrial process facilities involve numerous measurements at critical points of the system which are used to control the system. Successful operation of these systems depends on accurately knowing the times at which each measurement was taken and on applying controls at known times.

There are two aspects in providing accurate time in a distributed system in which each node contains a local clock. The first is syntonization, that is ensuring the local clocks at each node are running at the same rate. The second is synchronization, that is ensuring the local clocks report the same value of time at a given instant. The causes for inaccuracy and degradation in synchronization are the failure to maintain syntonization and inaccuracies in the setting or resetting of the local times values of the clocks. The local clocks lose syntonization because there are differences and drifts in the fundamental frequency of the oscillators which drive the clocks.

In systems requiring synchronization and syntonization, each local clock recognizes the local time of certain events and the nodes exchange messages to report these times. A preferred communication protocol between the nodes is a packet based serial protocol, such as Ethernet, token rings such as IEEE 802.5 or LonTalk (TM Echelon). In each node, the protocol is implemented by a protocol stack and the operating system of the node. The accuracy to which the clocks can be synchronized by exchanging messages currently is limited by the time jitter introduced by the protocol stack and operating system of each node. An additional problem is the latency or propagation delay of a message between nodes. In addition to the local protocol stacks and operating systems, jitter and delay can be introduced by other network elements such as gateways, bridges, and routers, or the physical communication medium.

One method to manage time jitter and latency between the nodes is to use dedicated, calibrated trigger lines between the various nodes to synchronize the clocks, measurements, or the application of control. Although the dedicated calibrated trigger lines can be very accurate, systems quickly become unmanageable and expensive as the number of nodes increases. Alternatively, the desired events may be controlled by issuing commands to the nodes from a central controller over a control bus, such as IEEE488, or serial protocols, such as Ethernet. Using a standard protocol improves the manageability of the system but at the expense of time accuracy.

Another method, as taught by Kopetz in U.S. Pat. No. 4,866,606, is to add a dedicated synchronization unit with a dedicated time output within each node. Each synchronization unit is connected to the local clock. Each local clock communicates with every node in the distributed network via the communication unit of the node to supply a global synchronized time signal. A message containing the local time of the sender is broadcast on the network by the synchronization unit. By observing these messages, the receiving node calculates a correction factor to be applied to the local clock. This system is illustrated in FIG. 1. However, as shown in FIG. 1, this technique may remove the effects of the operating system but does not remove the jitter and latency of the protocol stack of the communication system. Implementing the synchronization unit in a microprocessor may introduce jitter of its own due to operating system or interrupt behavior of the microprocessor. This system also introduces an unknown latency within the synchronization unit itself. As described by Kopetz, the synchronization unit must process all received messages which makes the jitter problem even harder to manage.

Another method, as disclosed by Hosgood in UK 2,254,455A, adds a dedicated "time bus". As shown in FIG. 2, each node contains a time generator, a time bus, and two snapshot registers. The local time of day is continuously output on the time bus. This method may remove operating system jitter and delay but does not solve the protocol stack jitter and delay problem. Although the local time at which the sending node submits a message to the communication module of the sending node is known, the receiving nodes do not know when a message was actually transmitted because the communications path between the node and the timing bus may have different propagation delays and the jitter in the protocol stacks of the participating nodes. Like Kopetz, the synchronous unit processes all received messages which increases the difficulty in managing the jitter problem.

To avoid the shortcomings of the prior art, it would be beneficial if each node in a distributed system maintained syntonization and synchronization of its local clock in an efficient and economical manner that minimized the temporal jitter and latency in the communication system. It would be a further advantage if the ability to syntonize and synchronize were present throughout the overall system.

SUMMARY OF THE INVENTION

The invention provides a method for syntonizing and synchronizing the local clocks in a loosely distributed network using messages carried by the communication media. The accuracy is improved by eliminating operating system and protocol stack delays using a "time packet detector". Each node contains a time packet detector (TPD) which recognizes signatures of specially designated timing packets in a jitter-free fashion. Although a node may receive a variety of message packets such as data, control, etc., the TPD solely detects the passage of the timing packets. The TPD observes the packet data stream as close to the communication media as possible to minimize delay and jitter that results from the local protocol stack and operation system. When a timing packet is detected by the TPD, the TPD generates a trigger signal, which may be used to capture the time from the local clock. The captured time is the local time at which the timing packet was received or transmitted by the node.

Timing packets are treated as events that are time stamped with the current local time at each node and these timestamps are then reported to the other nodes. These timestamps form the basis for the correction factors applied to each local clock. These factors may include corrections for latency between nodes. The remaining jitter is due only to the communication medium itself and the communication access mechanism between the time recording point and the communication medium.

In operation, a first node sends a first timing packet that is recognized and detected by its TPD. This TPD generates a transmitting timestamp that reflects the local time of transmission, as measured by the transmitting clock. The first timing packet may contain an identifier for unique identification. The transmission time and identifier of the first timing packet are subsequently transmitted by the transmitting node in a first synchronization message.

A second node receives the first timing packet and the first synchronization message from the first node. The TPD of the receiving node detects the arrival of the first timing packet and generates a reception timestamp that reflects the local time of reception, as measured by the receiving clock. The receiving node next receives the first synchronization message and compares the transmitting timestamp with the reception timestamp.

From a sequence of these packets and messages, the apparent difference and drift between the first and the second clocks can be computed and used with a suitable algorithm to synchronize and syntonize the clocks. The latency of the transmission of the timing packet may be measured by repeating the above sequence bidirectionally. Synchronization accuracy is improved by taking account of this latency measurement.

DETAILED DESCRIPTION OF THE PREFERRED EMBODIMENTS

Any node in a loosely distributed network can initiate a clock synchronization or syntonization process. Each of the nodes contains a time packet detector (TPD), a time service block (TSB), and a local media access block (LMA). The TPD and TSB, in concert, recognize the local time of transmission or receipt of timing packets as opposed to the time of scheduling or acknowledgment of the timing packet. The TPD detects timing packets that enter or leave the nodes. Timing packets are a specific packet type designated within the class of messages used in the communication protocol. The detected timing packets can be used by a receiving node for synchronization or event execution.

When a node initiates synchronization, it transmits a first timing packet followed by a synchronization message that contains the local transmittal time of the first timing packet. The receiving node (the node to be synchronized) compares the local transmittal time contained in the synchronization message with its local receipt time for the first timing packet. A sequence of such results may be used to synchronize or syntonize the clocks in the distributed network.

Figure 1:
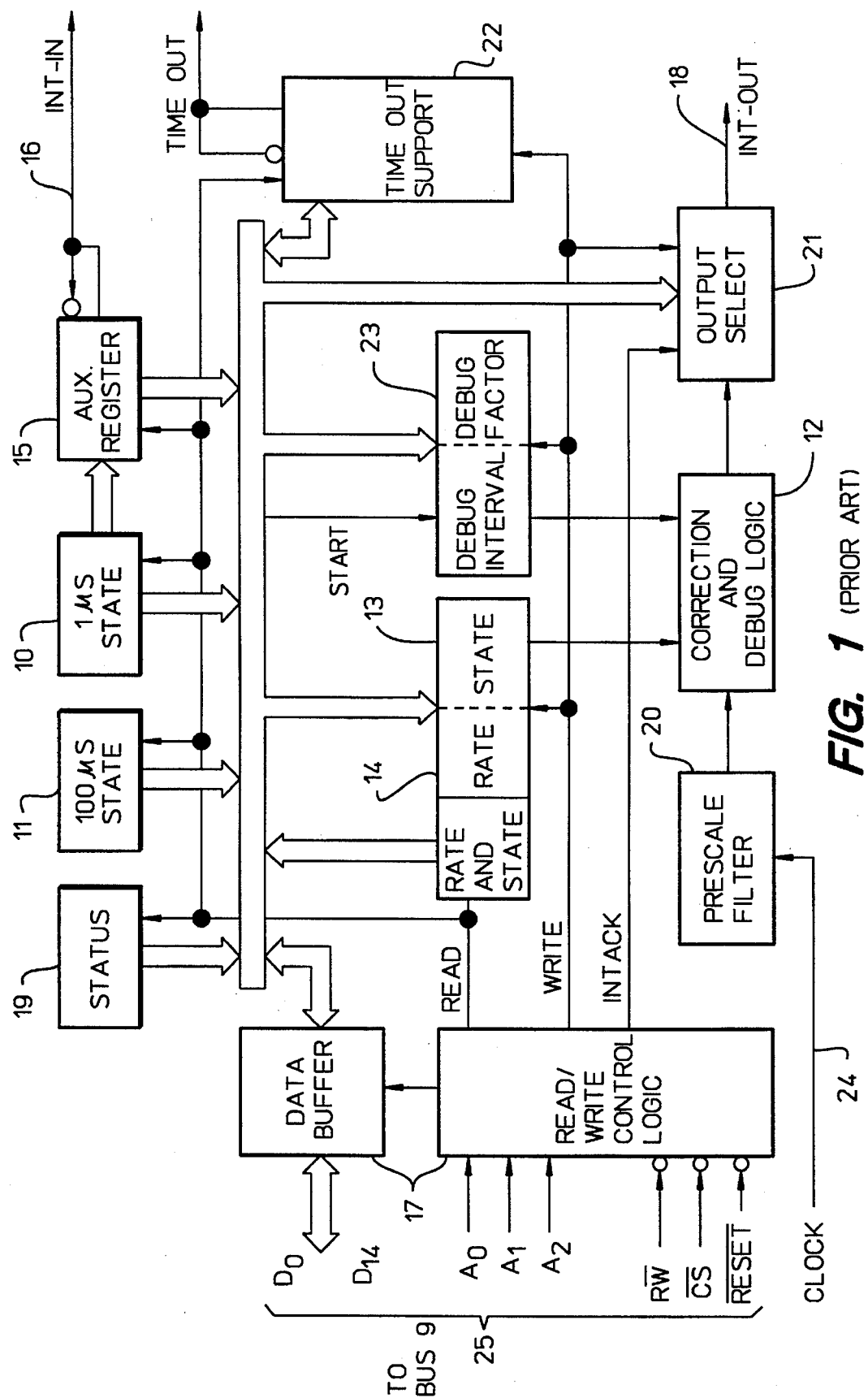
FIG. 1 illustrates a distributed system having a synchronization unit (prior art).
Figure 2:
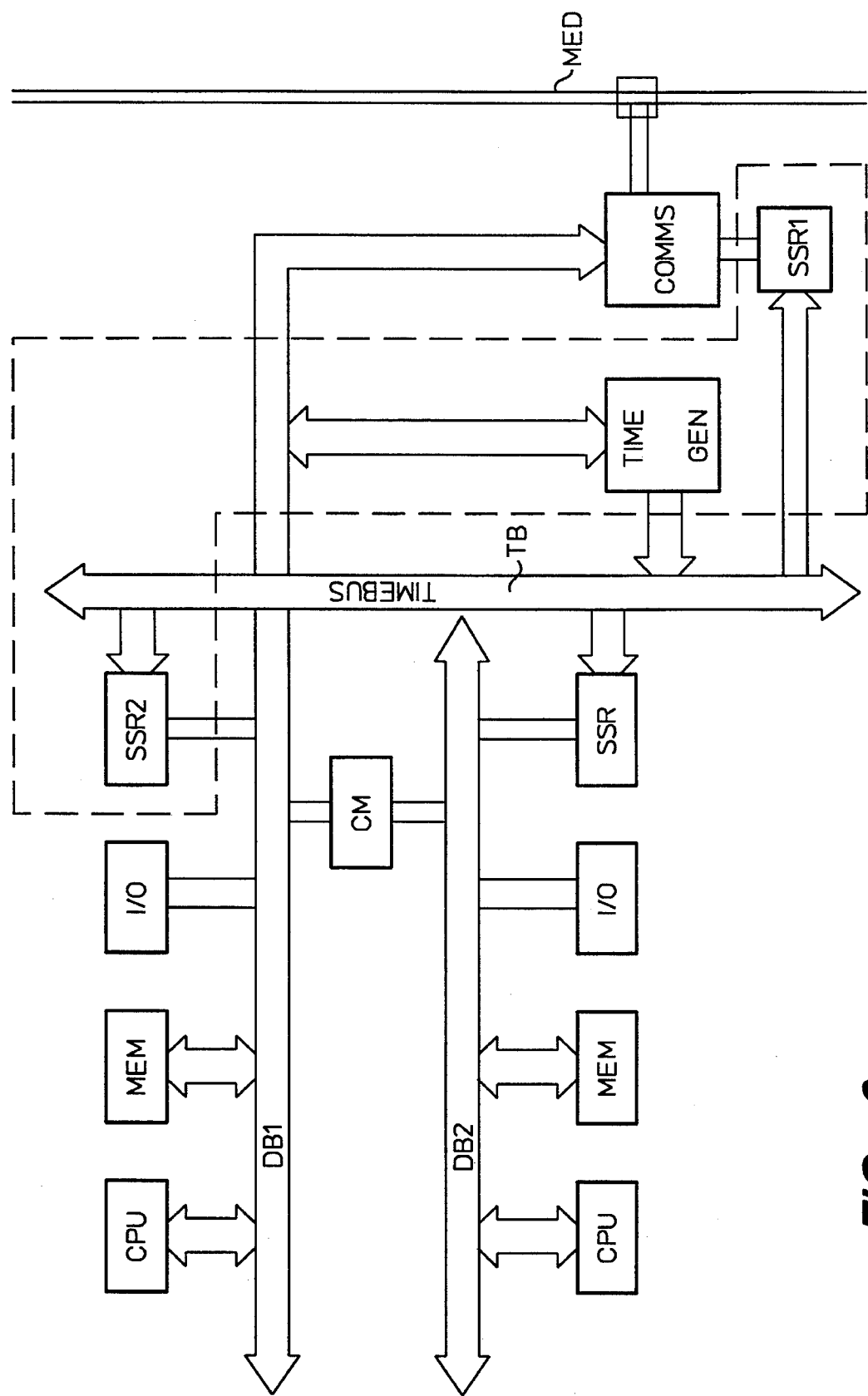
FIG. 2 illustrates a distributed system having a dedicated timing bus (prior art).
Figure 3:
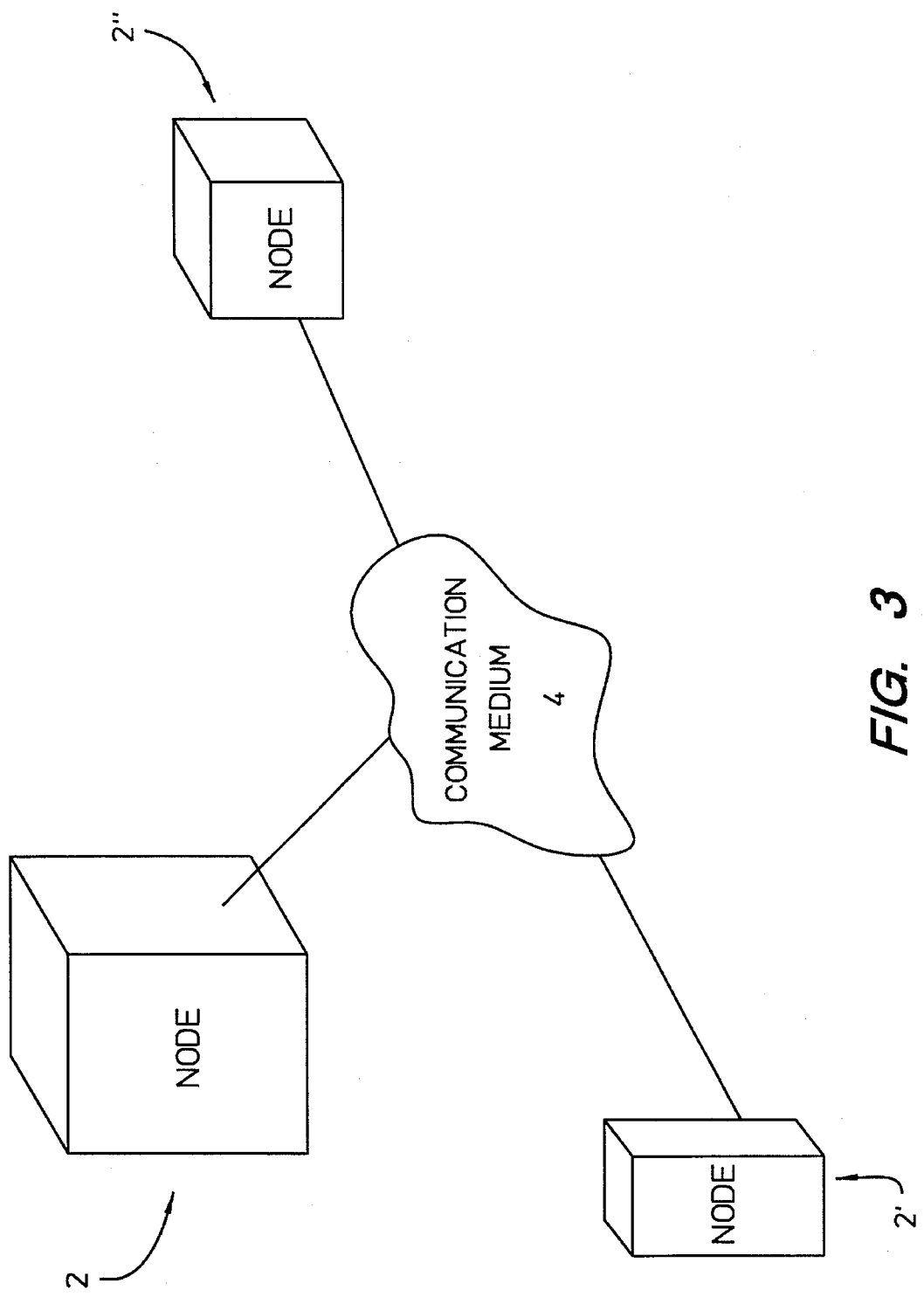
FIG. 3 illustrates a network having distributed synchronization and syntonization of the clocks.

FIG. 3 illustrates a network of nodes where timing of events is important. A first node 2 is connected to a second node 2' through a communication medium 4. An optional third node 2" is connected to the communication medium 4. Each node can both initiate and respond to timing packets and synchronization messages in the network. Although the nodes need not be identical, each node contains a time packet detector (TPD). Each TPD operates identically on inbound and outbound timing packets.

Figure 4:
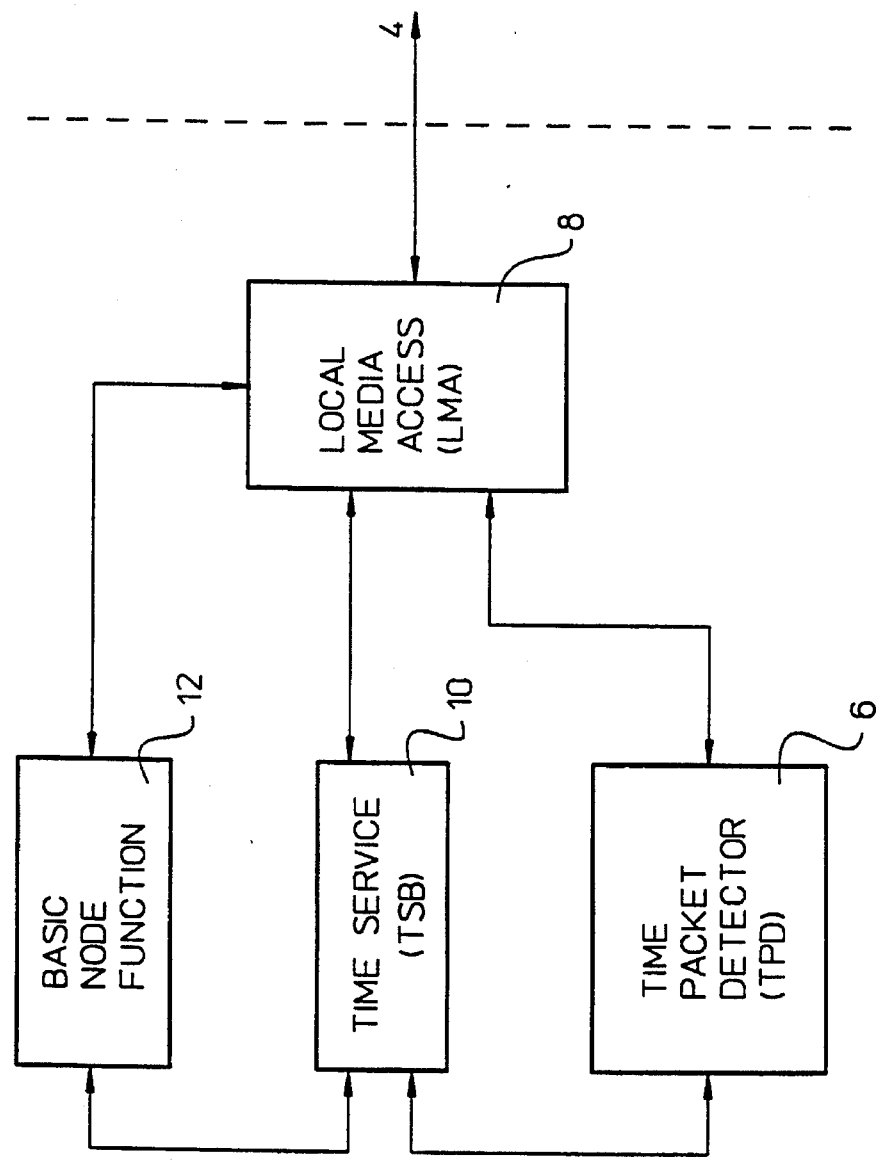
FIG. 4 illustrates a functional block diagram for node 2 shown in FIG. 3.

FIG. 4 illustrates a functional block diagram for node 2 shown in FIG. 3. A time packet detector (TPD) 6 is connected to a local media access block (LMA) 8 and a time service block (TSB) 10. The LMA 8 is connected to the TSB 10 and the communication medium 4. The TSB 10 and the LMA 8 are each connected to a basic node function block 12. The basic node function block 12 represents an application function that makes use of the timing service provided by the invention.

Figure 5:
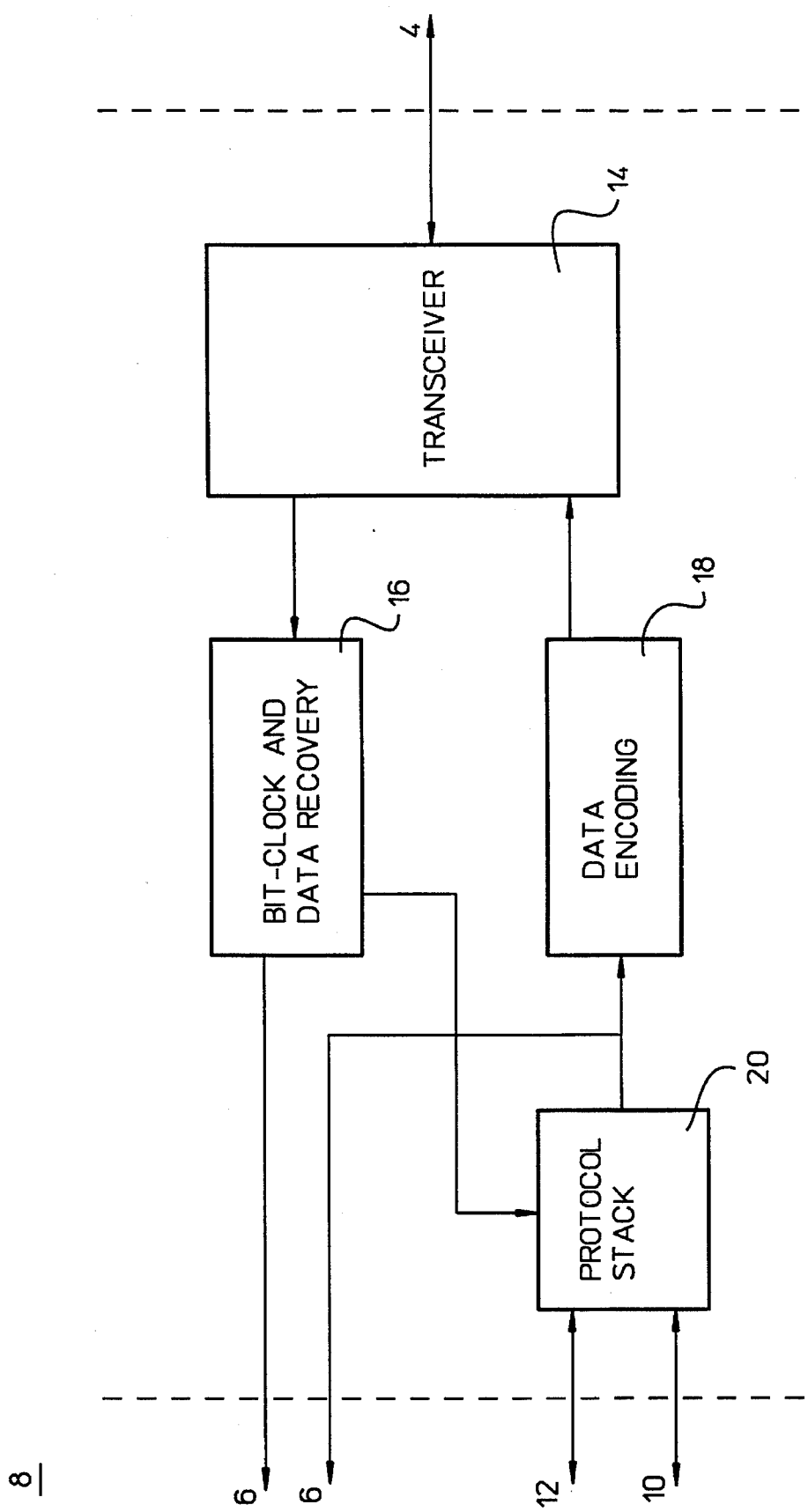
FIG. 5 shows a functional block diagram for the LMA shown in FIG. 4.

FIG. 5 illustrates a functional block diagram for the local media access block (LMA) 8 shown in FIG. 4. A transceiver 14 is connected to the communication medium 4, a bit-clock and data recovery block 16, and a data encoding block 18. The bit-clock and data recovery block 16 is connected to the transceiver 14, a protocol stack 20, and the TPD 6. The data encoding block 18 is further connected to the protocol stack 20 and the transceiver 14. The TPD 6 is connected to the data encoding block 18. The protocol stack 20 is connected to the TSB 10 and the basic node function block 12. The bit-clock and data recovery block 16 and the protocol stack 20 are further connected to the TPD 6.

The transceiver 14 provides physical access to the communication media 4. The bit-clock and data recovery block 16 receives raw signals from the transceiver 14 and recovers a bit-clock signal and a data bit stream which is synchronous with an incoming data bit stream. The jitter of this recovery process will typically be the dominant remaining source of jitter in the system.

The data encoding block 18 receives outbound packets from the protocol stack 20 and transforms these packets according to a selected protocol specification. The transformed packet is received by the transceiver 14. The TPD 6 monitors the outbound packets and the recovered inbound packets.

Figure 6:
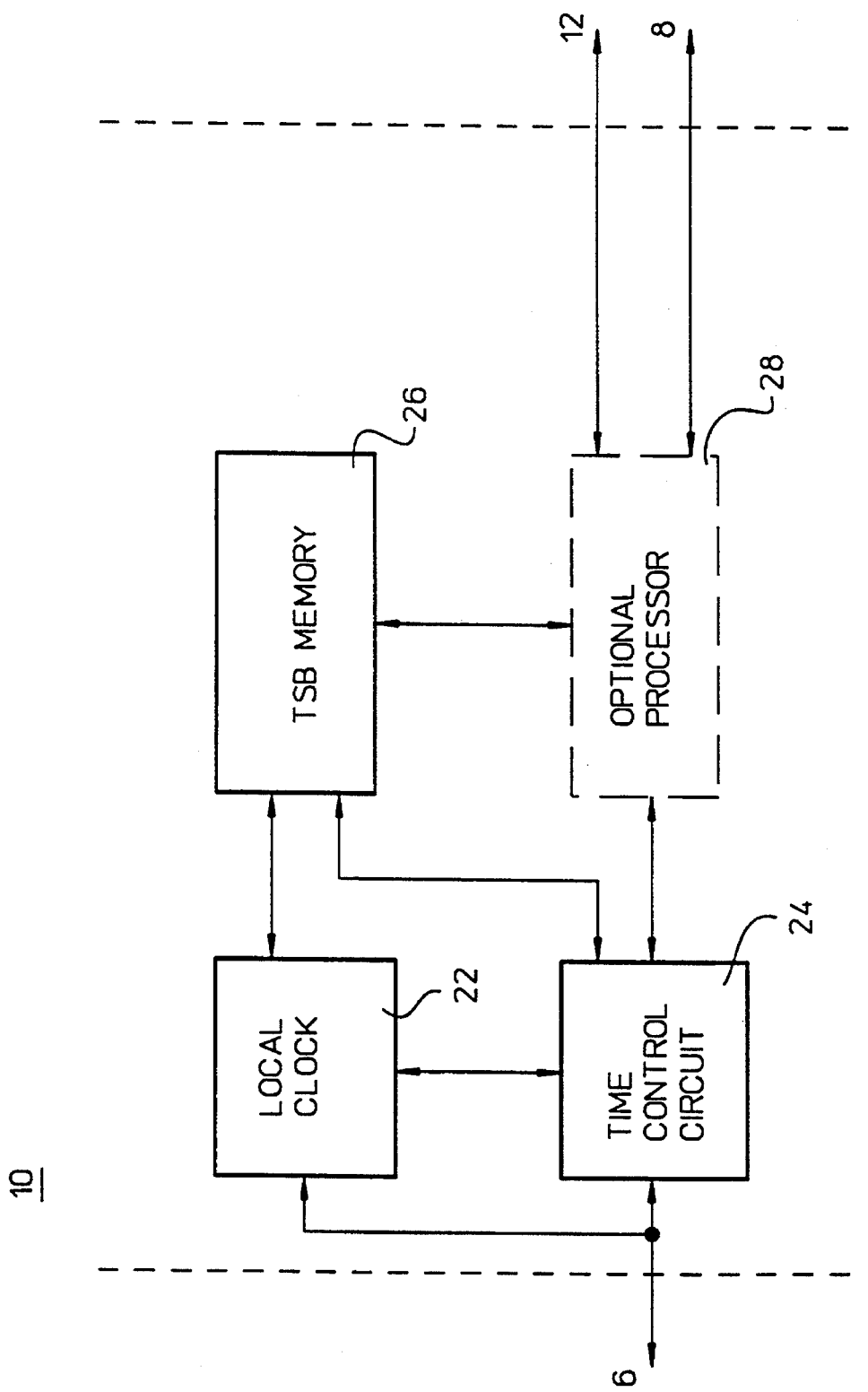
FIG. 6 shows a functional block diagram for the TSB shown in FIG. 4.

FIG. 6 illustrates a functional block diagram for the time service block (TSB) shown in FIG. 4. A local clock 22 is connected to a time control circuit 24, TSB memory 26, and the TPD 6. The TSB memory 26 is further connected to the time control circuit 24 and an optional processor 28. The time control circuit 24 connects to the TPD 6 and the optional processor 28. The time control circuit 24 connects to the basic node function 12 and the LMA 8 either directly or optionally via the optional processor 28.

The local clock 22 provides a representation of time and can be synchronized and syntonized. The local clock 22 contains circuitry that delivers the reading of the clock to the TSB memory 26 upon receipt of a suitable event signal from the TPD 6. The local clock 22 receives correction data and signals generated by the time control circuit 24, optionally in conjunction with the optional processor 28, for the synchronization and syntonization functionality. The correction data and signals are used to synchronize or syntonize the clock and the event signals are used for recording the TPD event time as measured by the local clock.

The TSB memory 26 stores captured values of the time received from the local clock 22. These values may be used by the time control circuit 24 or the optional processor 28 for computing the correction factors necessary for the clock adjustments. The time control circuit 24 also receives, via the LMA 8, the various timing packets and messages used in computing the various correction factors and for the overall control of the entire TSB 10. The time control circuit 24 may deliver optional pattern matching specifications, such as an identifier, to the TPD 6 for additional configuration and detection. The identifier may be used by the time control circuit 24 to associate the local detection time with the synchronization message received from the LMA 8.

The TSB 10 functionality may be supplemented to support the basic node functionality. Additional functionality may include time, additional memory for event detection, and generating event signals pertinent to the basic node functionality.

Figure 7:
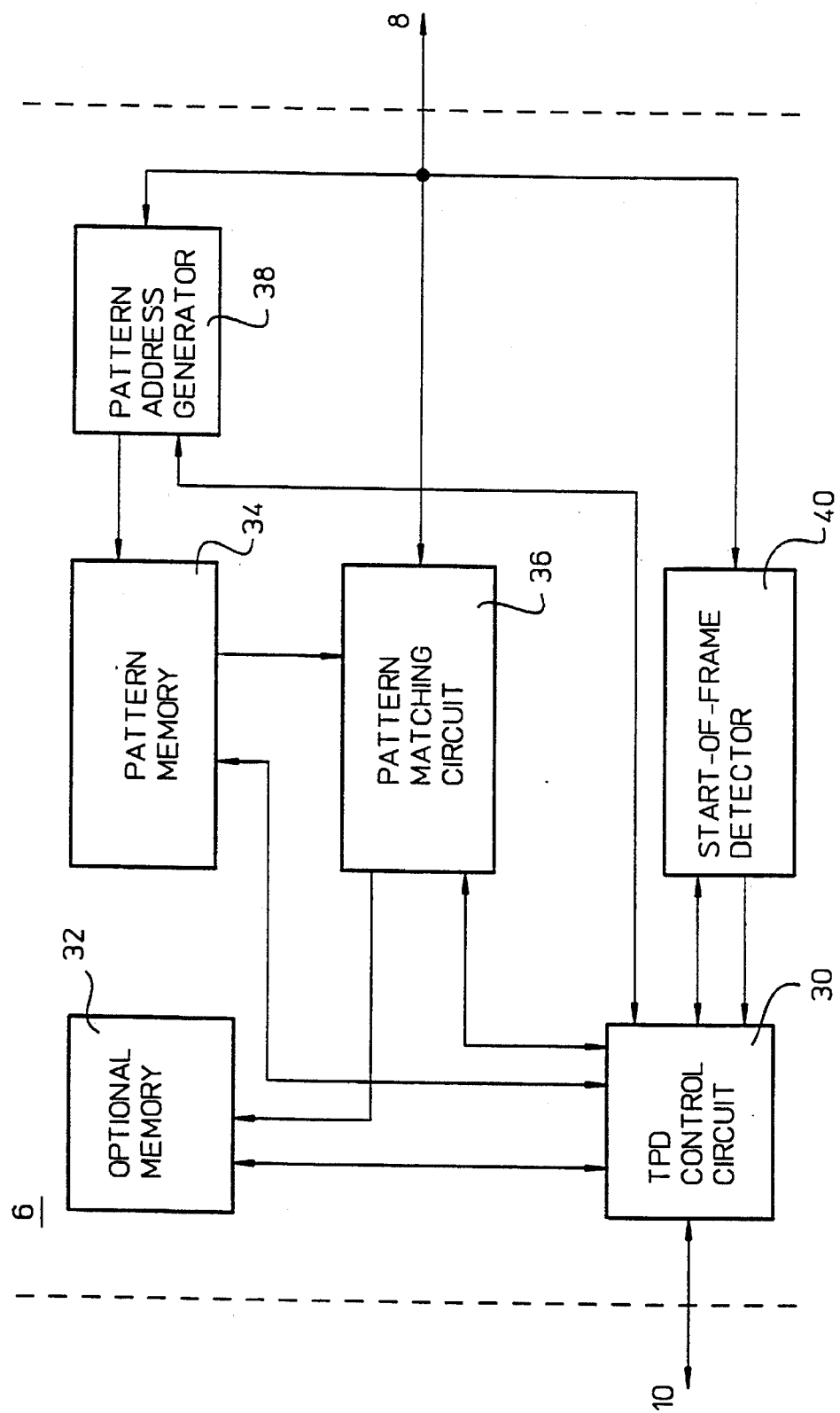
FIG. 7 shows a functional block diagram for the TPD shown in FIG. 4.

FIG. 7 illustrates a functional block diagram of the time packet detector (TPD) 6 shown in FIG. 4. A TPD control circuit 30 is connected to an optional memory 32, pattern memory 34, a pattern matching circuit 36, a pattern address generator 38, and a start-of-frame detector 40. The TPD control circuit 30 connects to the TSB 10. The pattern matching circuit 36 connects to the optional memory 32, pattern memory 34, and the LMA 8. The pattern address generator 38 further connects to pattern memory 34 and the LMA 8. The start-of-frame detector 40 further connects to the LMA 8.

The start-of-frame detector 40 monitors the incoming data stream and signals the TPD control circuit 30 when a start-of-frame condition is detected. In serial communication protocols, the data packet contains a pattern, called the training bit pattern or preamble, that is used by the bit-clock and data recovery block 16 to regenerate the data clock and data stream. The end of the preamble is marked by a special pattern that is detected by the start-of-frame detector 40 and indicates that the next bit will be the first bit of the packet header. The specifications of the training bit pattern and the start-of-frame mark are different for each communication protocol. The start-of-frame detector 40 may be implemented specifically for a given protocol, e.g. Ethernet, or it may be configurable for the protocol currently in use based on configuration data received from the TSB 10 via the TPD control circuit 30.

The data clock stream is also received by the pattern address generator 38 which generates an address to drive the pattern memory 34. The address reflects the bit count of the incoming data stream beginning with the first bit after the start-of-frame condition is detected. The pattern address generator 38 is enabled by the TPD control circuit 30 in response to a start-of-frame detector signal that indicates the start of a new frame.

The pattern memory 34 contains the bit patterns used by the pattern matching circuit 36 for recognizing and detecting the presence of the desired timing packet. These patterns are used by the pattern matching circuit 36 in concert with the corresponding data bit from the LMA 8 based on the address received from the pattern address generator 38. Typically this stream of pattern data will include the bits representing the bit pattern in the packet header or the user data and a mask pattern that indicate which bits are to be checked and which are to be ignored. Together these patterns enable the pattern matching circuit 36 to identify and detect a packet uniquely as being a timing packet. Typically this identification can be made based on address bits in the packet header but the technique works just as well if user data bits are included. For example, with the Ethernet protocol a broadcast address could be assigned to the timing packet and would appear as a unique address in the first six bytes of the packet header. This address would be unique in the system and therefore will enable the pattern matching circuitry to distinguish timing packets from all others.

The data in the pattern memory 34 is obtained from the TSB 10 via the TPD control circuit 30. This data is protocol and application dependent. Certain addresses may be permanently reserved as timing packets by all nodes. In this case, the patterns and optional control patterns may be loaded permanently into the pattern memory 34. In addition to the pattern data itself, there may be additional bit streams stored in the pattern memory 34 which aid the TPD control circuit 30. For example, a data pattern could be stored that contains a bit indicating that the last bit of the pattern that needs to be checked to determine a match has been processed. Likewise patterns could be stored that specify a pattern of bits, for example, the identifier bits, that are to be captured and stored in an optional memory 32. The optional memory 32, transmits this stored data to the TSB 10 via the TPD control circuit 30.

The pattern matching circuit 36 receives the incoming data stream from the LMA 8, and the pattern data from the pattern memory 34. When enabled, the pattern matching circuit 36 does a bit-by-bit check on the incoming data stream with respect to the data from the pattern memory 34. Any failure to make an appropriate match is noted and when the end-of-match condition is reached a signal is produced and sent to the TPD control circuit 30 for transfer to the TSB 10 indicating whether the current packet was a timing packet. The time-of-receipt of this signal indicates when the packet was detected. This end-of-match condition can be indicated either by a bit pattern delivered by the pattern memory 34 or a control signal from the TPD control circuit 30 derived from the pattern address generator 38. The timing of this end of match condition is known and constant and will depend on the mask pattern defining the bits of interest in the packet and will be consistent throughout the system for a given application. The pattern matching circuit 36 may contain optional matching and bit handling circuitry for additional control. Note that this process is jitter free apart from the picosecond level jitter of the individual gates in the pattern matching circuitry logic which will be orders of magnitude less than the remaining jitter from the bit-clock recovery portion of the LMA.

All of the functionality of the TPD 6, TSB 10, and part of the LMA 8 may be implemented in a single integrated circuit.

Figure 8:
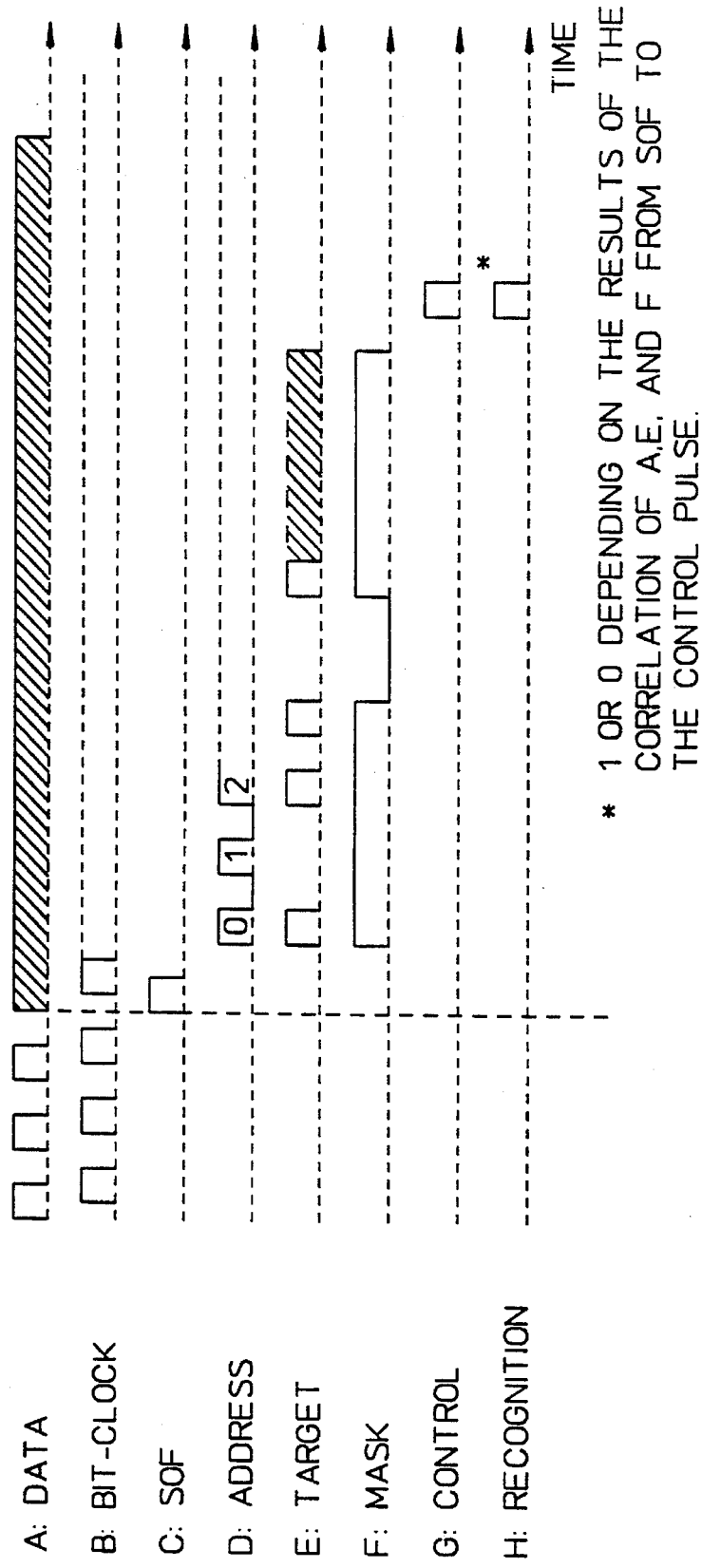
FIG. 8 illustrates a typical timing diagram of the operation of the TPD.

FIG. 8 is a timing diagram for the TPD. Line A is a data stream. Line B is a recovered bit-clock stream. Line C is a control bit indicating the start-of-frame. Line D is pattern memory address. Line E is a target data stream. Line F is a mask stream. Line G indicates the end-of-match condition. Line H is a recognition signal.

This functionality has been described as if the incoming data stream were a single bit wide. Some newer serial protocols have a serial data stream that is several bits wide. The extension of the technique described here to such streams is obvious, namely the width of the patterns in the pattern memory 34 and of the pattern matching circuit 36 is increased to match the width of the incoming data stream.

Figure 9:
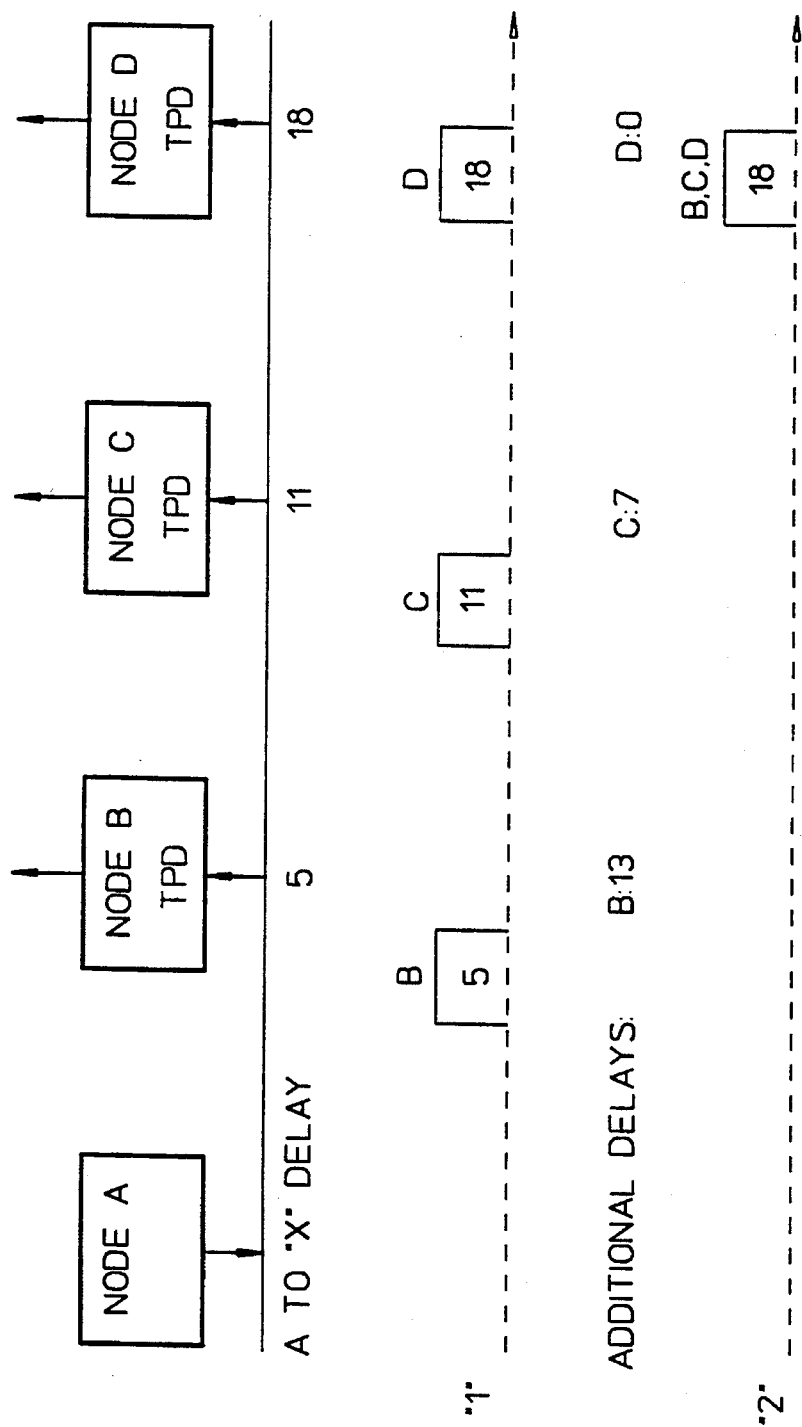
FIG. 9 illustrates using the time packet detector as an event trigger mechanism.

FIG. 9 illustrates a timing diagram when the timing packet detector is used as an event trigger generator. Each node is connected to the communication medium. Node A initiates a timing packet that is detected at successively later times along the network by the other nodes as indicated in the timing diagram 1. The TPD of each node recognizes and detects the timing packet and generates the recognition signal which is used for some application purpose, e.g., closing a relay. These pulses will be offset in time from each other by the respective propagation delays. If the propagation delays are measured, as discussed later, then the pulses may be delayed by the TSB of each node by the amount shown resulting in simultaneous pulses as shown in timing diagram 2.

Figure 10:
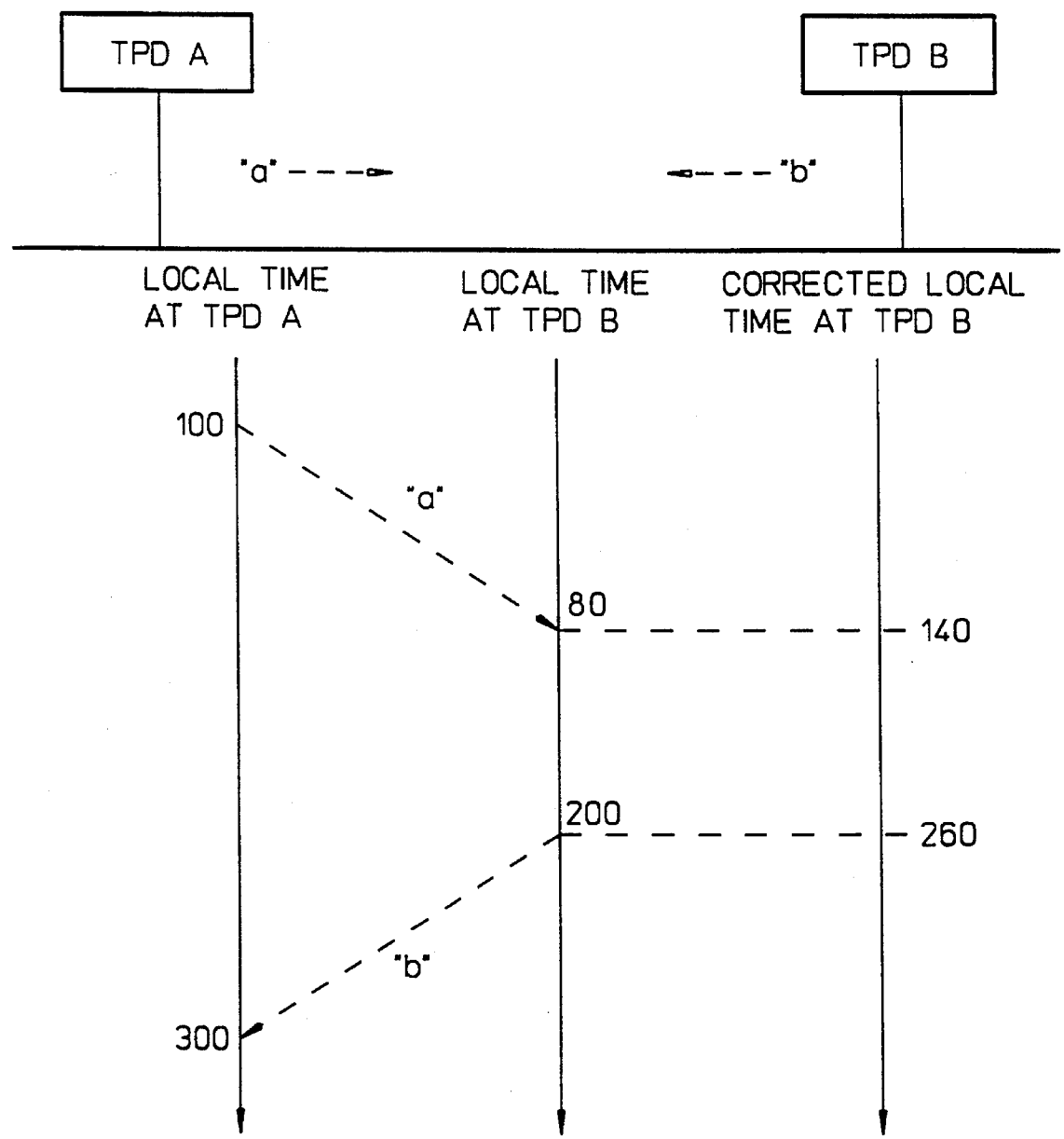
FIG. 10 illustrates the use of the TPD for measuring propagation time

FIG. 10 shows a timing diagram when the timing packet detector is used for measuring the propagation delay, or latency, between two nodes. Thus Node A sends timing packet "a" which is seen by the TPD at A at a local time of 100 ns and at the TPD of B at a local time of 80 ns. Next Node B sends timing packet "b" which is seen by the TPD at B at a local time of 200 ns and at the TPD of A at a local time of 300 ns. It is reasonable to assume the delay is symmetric since equivalent delays are encountered by both packets in each node and the medium. After the two nodes exchange a second set of synchronization messages, each containing the respective measured time, each node can compute that the A to B apparent propagation time is −20 ns and the B to A apparent propagation time is 100 ns. The average of these is the actual delay, 40 ns. It is also apparent that the local clock in Node B lags the clock in Node A by 60 ns at the time of the experiment.

Figure 11:
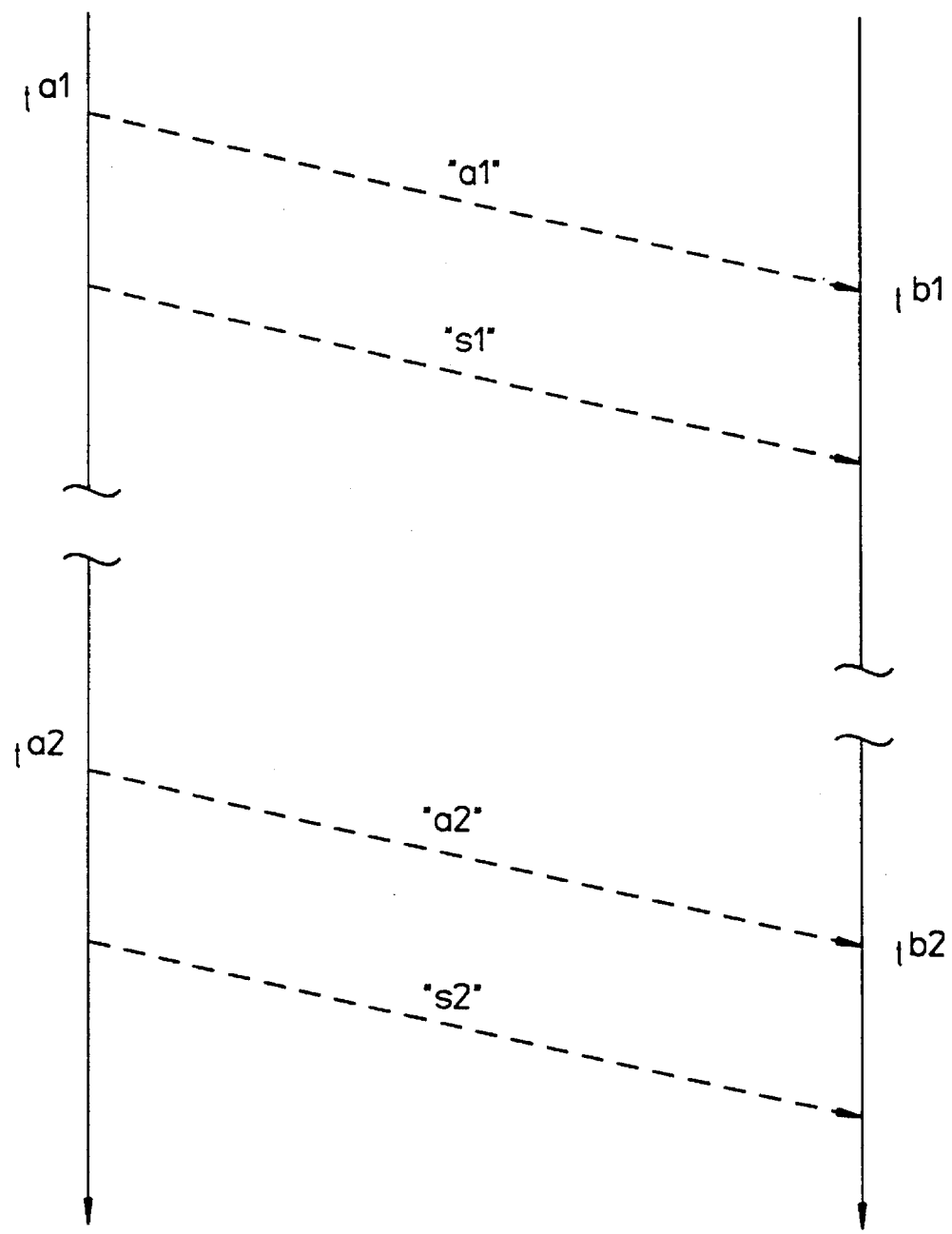
FIG. 11 illustrates the use of the TPD in adjusting the local clocks

FIG. 11 illustrates the timing diagram when the timing packet detector is used for adjusting the local clocks of two nodes so that they are synchronous and syntonous. In this example, Node A is the clock initiating synchronization. The times of detection of the various packets by the TPDs of each node are noted later. Assume for example that the propagation delay between the two nodes has been determined to be 40 ns as in the description of FIG. 10.

Node A sends timing packet "a1" which is detected by TPD A at time ta1=0.

Timing packet "a1" is detected by TPD B at time tb1=140 ns.

Node A sends a synchronization message "s1" containing the information ta1=0

Node B receives "s1" and computes an apparent time difference B-A of 140 ns. Node B corrects this value by the known propagation delay of 40 ns to conclude that the clock at B is ahead of the clock at A by 100 ns.

Node A sends timing packet "a2" that is detected by TPD A at time ta2=1 second

Timing packet "a2" is detected by TPD B at time tb2=1 s+240 ns.

Node A sends a synchronization message "s2" containing the information ta2=1 s.

Node B receives "s2" and computes an apparent time difference B-A of 240 ns. Node B corrects this value by the known propagation delay of 40 ns to conclude that the clock at B is ahead of A by 200 ns.

Node B resets its local clock back by 200 ns so that it is synchronous with the clock at Node A. Node B computes that between "a1" and "a2", an interval of 1 second on the clock of Node A that the clock of Node B gained 100 ns. Node B then adjusts the rate of its local clock to slow it down by 100 ns/second.

By periodic application of this basic method the clocks of two nodes may be kept in agreement. Clearly if the fundamental stability of the oscillators driving the clocks is adequate, suitable averaging of a series of measurements may be made to reduce further the effect of jitter. Likewise these basic measurements may be made by an ensemble of nodes and a variety of algorithms, well documented in the literature, applied to produce global agreement of the clocks.

Although the invention has been described using master-slave algorithm between nodes, the timing protocol can be extended to a distributed algorithm by providing each node with full transmitting and receiving capability of the timing packets and synchronization messages. Thus, each node can perform the computations and actions required by the distributed algorithm.

Figure 12A:
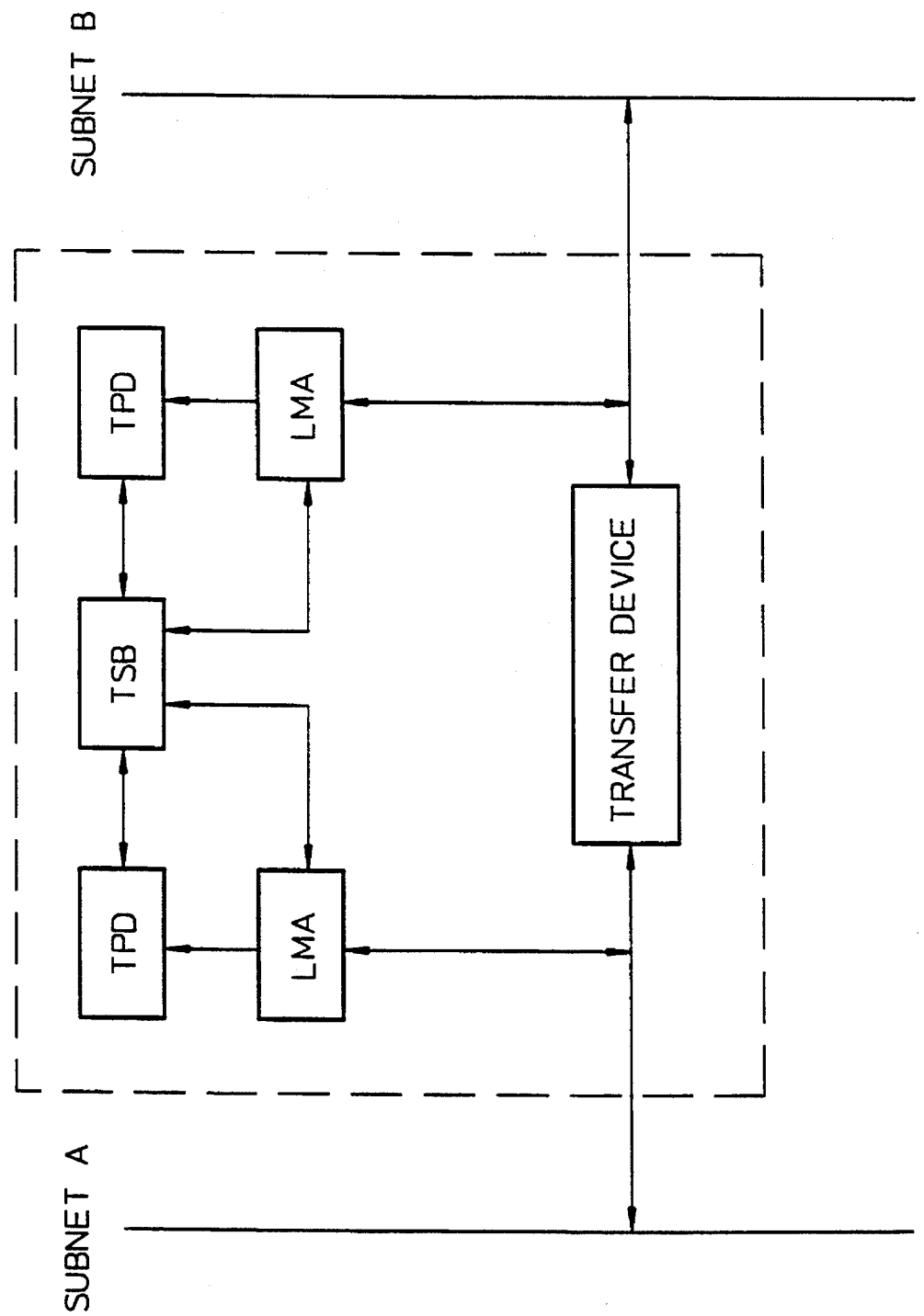
FIGS. 12A and 12B illustrate the use of TPDs to overcome jitter and delay in a network.
Figure 12B:
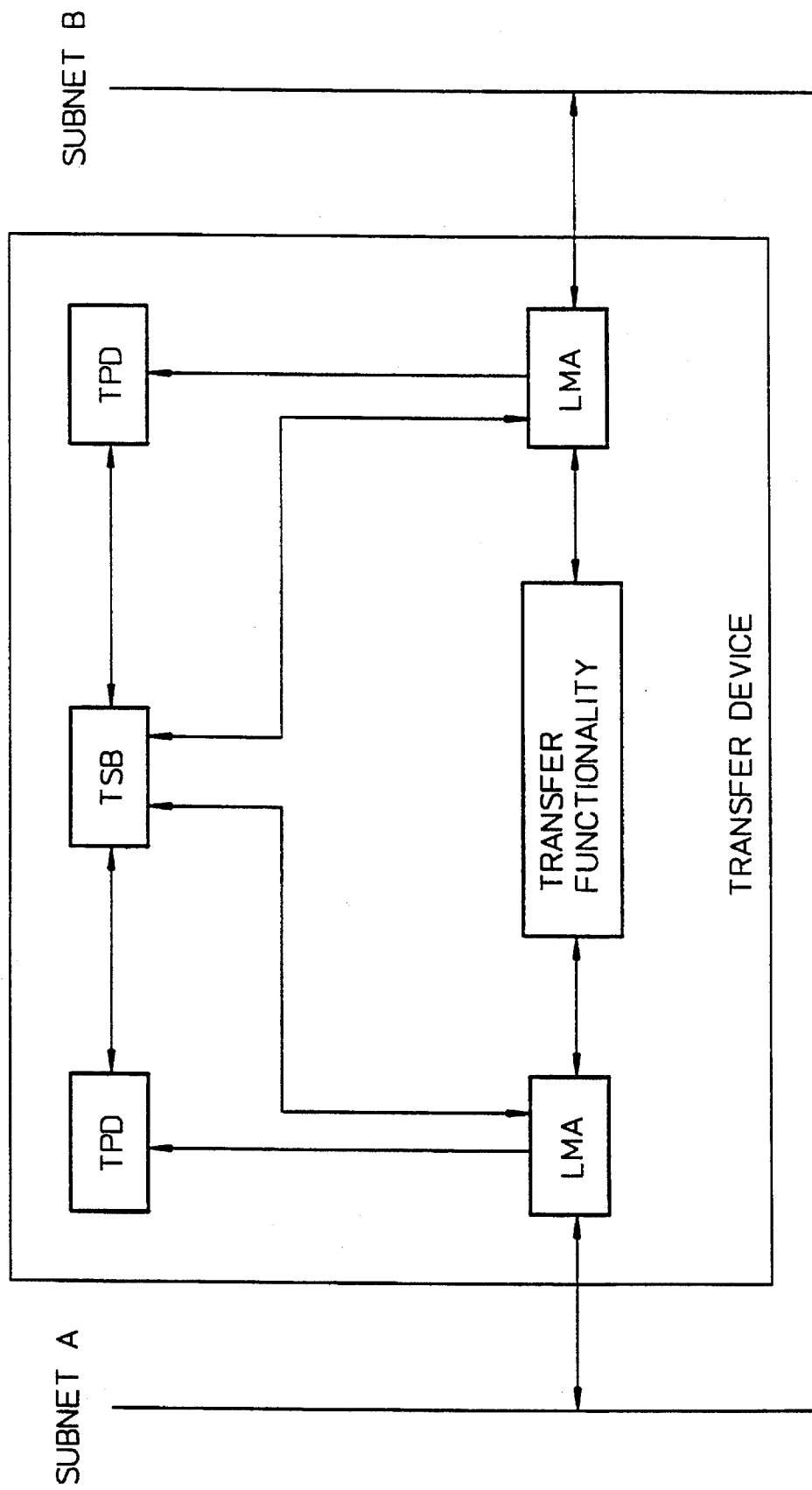

FIGS. 12A and 12B illustrate the use of timing packet detectors to overcome jitter and delay in a network. FIG. 12A illustrates the TPDs as external to the transfer device and FIG. 12B illustrates the TPDs designed into a transfer device. Two subnets of the communication network A and B are shown with a transfer device providing the communication path between the two subnets. Also shown are LMAs and TPDs serving each side of the transfer device and communicating with the respective communication media. The two TPDs and LMAs also interact with a common TSB.

There are two ways in which the components illustrated in FIGS. 12A and 12B may be used to achieve clock agreement in time critical nodes separated by the transfer device. The first is for all of the nodes in both subnets, A and B, to agree that the "clock in the TSB associated with the transfer device" is the master clock, and to synchronize and syntonize the time critical nodes with this master clock as described earlier.

A second technique is to have the TPDs and the TSB at the transfer device record the time that timing packets spend in transit through the transfer device and to report this per packet additional delay to the nodes receiving the timing packet so that they may correct for the additional delay.

In both cases, the communication protocol and medium may be different on the A and B sides of the transfer device without loss of accuracy since the delay in the detection process of the two TPDs is constant and can be computed based on the protocol and the detection and recognition pattern. In addition, using the techniques described earlier, the clock of the transfer device may be simultaneously synchronized to a node in a first subnet while acting as the master clock for nodes in the second subnet.

We claim:

1. A data communication network, having distributed time synchronization, comprising:

a first node, generating a first timing data packet, being operative to detect a local transmittal time for the first timing data packet and to transmit the local transmittal time in a corresponding associated message;

a second node, receiving the first timing data packet, including:

a local media access means for observing packets and associated messages, and a timing packet detector, connecting to the local media access means, detecting arrivals and departures of the packets; and communication means for carrying the packets and associated messages between the first and second nodes;

wherein the second node produces a corresponding action when the timing packet detector of the second node detects the arrival of the first timing data packet.

2. A data communication network, having distributed time synchronization, as defined in claim 1, further comprising:

the first node including:
a first local clock,
a local media access means for observing the packets and messages,
a timing packet detector, connecting to the local media access means, detecting arrivals and departures of the packets, and
a first time server, connecting to the timing packet detector of the first node and the first local clock, marking a detection time for packets and generating a message corresponding to a detection of a packet, wherein the first time server generates a first time synchronization message which contains a departure time for the first timing data packet when the first timing packet detector detects the first timing data packet departing from the local media access means of the first node; and the second node further includes:
a second local clock,
a second time server, connecting to the second local clock and the timing packet detector of the second node and the local media access means of the second node, marking a detection time for packets and generating a message corresponding to a detection of a packet, wherein the second time server marks the arrival of the first timing data packet,
a comparator, connecting to the second time server, receiving the first time synchronization message, comparing the departure time and the arrival time of the first timing data packet and producing a first difference signal indicating an apparent difference between the first and the second local clocks, and
error correction means, connecting to the comparator, for adjusting the second local clock, wherein the second local clock is synchronized according to the first difference signal.

3. A data communication network, having distributed time synchronization, as defined in claim 2, wherein the second node generates a second timing data packet and the second time server generates a second time synchronization message which contains a departure time for the second timing data packet when the timing packet detector of the second node detects the second timing data packet departing from the local media access means of the second node, the first node further including:

the timing packet detector of the first node detecting the second timing data packet arriving at the local media access means of the first node;

a comparator, connecting to the first time server, comparing the departure time and the arrival time of the second timing data packet and producing a second difference signal indicating an apparent difference between the first and second local clocks; and the first time server generates a time propagation message which contains the second difference signal;

wherein the comparator of the second node determines a propagation delay between the timing packet detectors of the first and the second nodes using the first synchronization message and the time propagation message when the second time server receives the time propagation message.

4. A data communication network, having distributed time synchronization, as defined in claim 3, wherein the comparator of the second node adjusts the first difference signal according to the propagation delay.

5. A data communication network, having distributed time synchronization, as defined in claim 4, the communication means including:

a first subnet, connecting to the first node;

a second subnet, connecting to the second node; and a transfer device, connecting between the first and the second subnet, the transfer device comprising:
a transfer device clock,
a transfer means for transferring packets between the first and the second subnets, connecting between the first and the second subnets,
a first transfer local media access means, connecting to the first subnet, for observing the packets and messages,
a first transfer device timing packet detector, connecting to the first local media access means, detecting arrivals and departures of the packets, wherein the first transfer device timing packet detector detects the first timing data packet arriving at the first transfer local media access means and produces a first transfer recognition signal,
a second transfer local media access means for observing the packets and messages, connecting to the second subnet,
a second transfer device timing packet detector, connecting to the second transfer local media access means, detecting arrivals and departures of the packets, wherein the second transfer device timing packet detector detects the first timing data packet departing from the second transfer local media access means and produces a second transfer recognition signal,
a transfer device time server, connecting to the transfer device clock, receiving the first and second transfer recognition signals and recording a local arrival time for the first timing data packet and a local departure time for the first timing data packet, and
computation means, connecting to the transfer device time server, for computing a first transfer device transit time from the local arrival time and the local departure time of the first timing data packet and for generating a transit time message containing the first transfer device transit time;

wherein the comparator of the second node adjusts the first difference signal according to the first transfer device transit time.

6. A data communication network, having distributed time synchronization, as defined in claim 5, the transfer device further comprising:

the first transfer device timing packet detector detecting the second timing data packet arriving at the first transfer local access media means and the second transfer device timing packet detector detects the second timing data packet departing from the second transfer local access media means;

the transfer device time server recording a local arrival time and a local departure time for the second timing data packet; and the computation means for computing a second transfer device transit time from the local arrival time and the local departure time for the second timing data packet and generating a second transit time message which contains the second transfer device transit time;

wherein the comparator of the first node adjusts the second difference signal according to the second transfer device transit time.

7. A data communication network, having distributed time synchronization, as defined in claim 4, the communication means including:

a first subnet, connecting to the first node;

a second subnet, connecting to the second node; and a transfer device, connecting between the first and the second subnet, the transfer device comprising:

a transfer device clock, a transfer means for transferring packets between the first and the second subnets, connecting between the first and the second subnets, a first transfer local media access means for observing the packets and messages, connecting to the first subnet, a first transfer device timing packet detector, connecting to the first local media access means, detecting departures of the packets and messages, wherein the first transfer device timing packet detector detects the first timing data packet from the first node and produces a first transfer recognition signal, a transfer device time server, connecting to the transfer device clock, marking the arrival of the first timing data packet, generating packets and messages corresponding to the first timing data packet, a comparator, connecting to the transfer device time server, receiving the first time synchronization message from the first node, comparing the departure time and the arrival time of the first timing data packet and producing a transfer difference signal indicating an apparent difference between the first local clock and the transfer device clock, a transfer error correction means, connecting to the comparator, for adjusting the transfer device clock, wherein the transfer device clock is synchronized according to the transfer difference signal, a second transfer local media access means for observing the packets and messages, connecting to the second subnet, and a second transfer device timing packet detector, connecting to the second local media access means, detecting departures of the packets and messages, wherein the second transfer device timing packet detector detects the first timing data packet departing from the second transfer local access means and the transfer device time server produces a transfer synchronization message which contains the departure time of the first timing data packet;

wherein the comparator of the second node adjusts the second difference signal according to the transfer synchronization message.

8. A data communication network, having distributed time synchronization, as defined in claim 4, the communication means including:

a first subnet, connecting to the first node;

a second subnet, connecting to the second node; and a transfer device, connecting between the first and the second subnet, the transfer device comprising:

a transfer device clock, a transfer means for transferring packets between the first and the second subnets, connecting between the first and the second subnets, a first transfer local media access means for observing the packets and messages, connecting to the first subnet, a first transfer device timing packet detector, connecting to the first local media access means, detecting departures of the packets and messages, wherein the first transfer device timing packet detector detects the first transfer timing data packet departing from the first transfer local access media means and produces a first transfer recognition signal, a second transfer local media access means for observing the packets and messages, connecting to the second subnet, a second transfer device timing packet detector, connecting to the second local media access means, detecting departures of the packets and messages, wherein the second transfer device timing packet detector detects a second transfer timing data packet departing from the second transfer local access means and produces a second transfer recognition signal, a transfer device time server, connecting to the transfer device clock, generating packets and messages, receiving the first and second transfer recognition signals and recording a local departure time for the first transfer timing data packet and a local departure time for the second transfer timing data packet, and computation means, connecting to the transfer device time server, for generating a first transfer synchronization message which contains the local departure time for the first transfer timing data packet and a second transfer synchronization message which contains the local departure time for the second transfer timing data packet;

wherein the comparator of the first node adjusts the second difference signal according to the first transfer synchronization message and the comparator of the second node adjusts the first difference signal according to the second transfer synchronization message.

9. A data communication network, having distributed time synchronization, as defined in claim 8, further comprising:

the transfer device receiving the second timing data packet and the second time synchronization message from the second node and receiving the first timing data packet and the first time synchronization message from the first node; and the computation means of the transfer device for determining a first subnet propagation delay between the first node and the transfer device and a second subnet propagation delay between the second node and the transfer device;

wherein the comparator of the first node adjusts the second difference signal according to the first subnet propagation delay and the comparator of the second node adjusts the first difference signal according to the second subnet propagation delay.

10. A network transfer device for transferring packets and associated messages between a first and a second subnet of a network comprising:

a transfer device clock;

a transfer means for transferring packets between the first and the second subnets, wherein each packet has a local transmittal time and an associated message, connecting between the first and the second subnets;

a first transfer local media access means for observing the packets and associated messages, wherein the local transmittal time of each packet is contained within the corresponding associated message, connecting to the first subnet;

a first timing packet detector, connecting to the first transfer local media access means, detecting arrivals and departures of the packets, wherein the first timing packet detector detects a timing data packet arriving at the first transfer local media access means and produces a first recognition signal;

a second transfer local media access means for observing the packets and associated messages, connecting to the second subnet;

a second timing packet detector, connecting to the second transfer local media access means, detecting arrivals and departures of the packets, wherein the second timing packet detector detects the timing data packet departing from the second transfer local media access means and produces a second recognition signal;

a transfer device time server, connecting to the transfer device clock and the first and second timing packet detectors, recording a local arrival time and a local departure time for the timing data packet according to the first and second recognition signals; and computation means, connecting to the transfer device time server, computing a transfer device transit time from local arrival time and local departure time and generating a transit time message containing the transit time.

11. A network transfer device for transferring packets and associated messages between a first and a second subnet of a network, comprising:

a transfer device clock;

a transfer means for transferring packets between the first and the second subnets, connecting between the first and the second subnets;

a first transfer local media access means for observing the packets and associated messages, wherein the each packet has a local transmittal time, connecting to the first subnet;

a first transfer device timing packet detector, connecting to the first local media access means, detecting departures of the packets, wherein the local transmittal time of each packet is contained within the corresponding associated message;

wherein the first transfer device timing packet detector detects the first transfer timing data packet departing from the first transfer local access media means and produces a first transfer recognition signal;

a second transfer local media access means for observing the packets and associated messages, connecting to the second subnet, a second transfer device timing packet detector, connecting to the second local media access means, detecting departures of the packets;

wherein the second transfer device timing packet detector detects a second transfer timing data packet departing from the second transfer local access means and produces a second transfer recognition signal;

a transfer device time server, connecting to the transfer device clock, generating packets and associated messages, receiving the first and second transfer recognition signals and recording a local departure time for the first transfer timing data packet and a local departure time for the second transfer timing data packet; and computation means, connecting to the transfer device time server, for generating a first transfer synchronization message which contains the local departure time for the first transfer timing data packet and a second transfer synchronization message which contains the local departure time for the second transfer timing data packet.

12. A data communication network, having distributed time synchronization, as defined in claim 11, further comprising:

the transfer device receiving the second timing data packet and the second time synchronization message from the second node and receiving the first timing data packet and the first time synchronization message from the first node; and the computation means of the transfer device for determining a first subnet propagation delay between the first node and the transfer device and a second subnet propagation delay between the second node and the transfer device.

* * * * *